Figure 1:
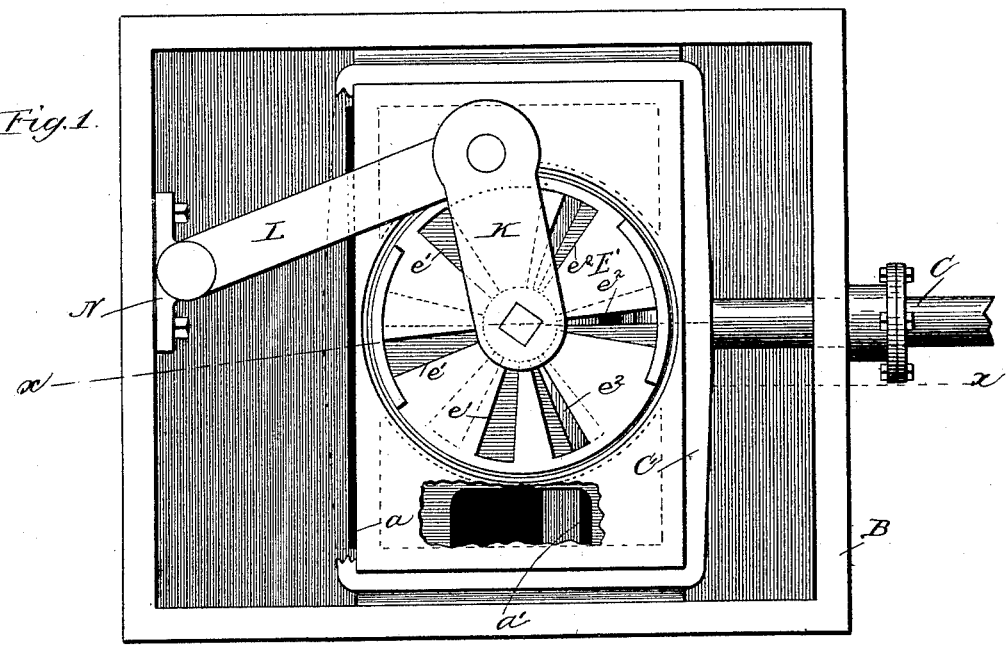

(No Model.) 3 Sheets—Sheet 1.

C. SCHMID.
VALVE MECHANISM FOR ENGINES.

No. 437,672. Patented Sept. 30, 1890.

(No Model.) 3 Sheets—Sheet 2.

C. SCHMID.
VALVE MECHANISM FOR ENGINES.

No. 437,672. Patented Sept. 30, 1890.

Witnesses
W. Rosseter
Fred'k H. Mill

Inventor
Charles Schmid
By Rice & Fisher
His Atty's.

(No Model.) 3 Sheets—Sheet 3.
C. SCHMID.
VALVE MECHANISM FOR ENGINES.
No. 437,672. Patented Sept. 30, 1890.
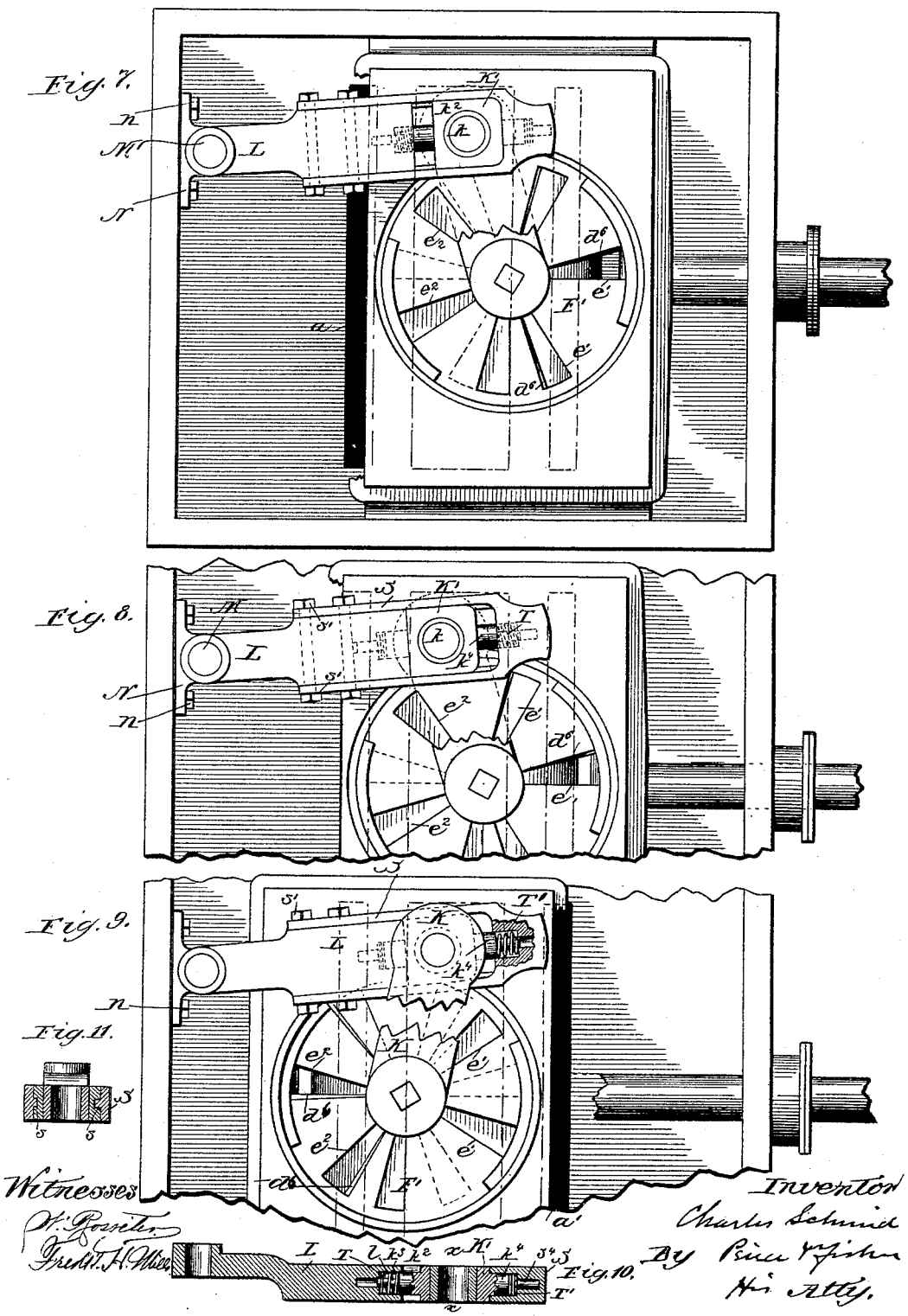

UNITED STATES PATENT OFFICE.

CHARLES SCHMID, OF CHICAGO, ILLINOIS, ASSIGNOR TO THE AMERICAN VALVE AND GOVERNOR COMPANY, OF SAME PLACE.

VALVE MECHANISM FOR ENGINES.

SPECIFICATION forming part of Letters Patent No. 437,672, dated September 30, 1890.

Application filed February 20, 1888. Renewed March 4, 1890. Serial No. 342,543. (No model.)

*To all whom it may concern:*

Be it known that I, CHARLES SCHMID, a citizen of the United States, residing at Chicago, in the county of Cook and State of Illinois, have invented certain new and useful Improvements in Valve Mechanism for Steam-Engines, of which I do declare the following to be a full, clear, and exact description, reference being had to the accompanying drawings, forming part of this specification.

My present invention has relation to the improvement of that class of valve mechanism for steam-engines wherein provision is made for relieving the back-pressure or resistance on the exhaust side of the main piston, so that the loss of energy and consequent increase of the working cost incident to such resistance may be avoided, and particularly does my invention relate to the improvement of the valve mechanism illustrated in the Letters Patent of the United States granted to me and to George Farnsworth as my assignee on the 10th day of August, A. D. 1886, No. 347,012. In the mechanism described in said patent the main slide-valve was provided with a series of escape-ports, (four in number,) the opening and closing of such ports being controlled by a supplemental valve having a like number of apertures or ports formed therein; and in such construction, also, the supplemental valve, which was arranged to rotate about a central pin or arbor, was held in proper bearing against its seat by means of a flanged retaining-ring bolted to the body of the main valve at the periphery of and overlapping the supplemental valve.

One of the objects of my present invention is to so improve the construction of the valve mechanism that a greater area can be given to the escape-ports formed in the body of the main valve and to the apertures formed in the supplemental valve and adapted to be brought coincident with said ports, and this object I have accomplished by doing away with the flanged retaining-ring that was employed in my former patented construction, so that the apertures in the supplemental valve could be extended to a point much nearer to the edge of such valve and a corresponding increase could be made in the escape-ports in the port-plate of the main valve. In my former patent the cover of the main valve was attached to the side walls of such valve by bolts or rivets, and a further object of my present invention is to so form the cover of the main valve that the necessity of employing bolts or rivets for its attachment to the valve will be avoided.

In my former patent, above referred to, the supplemental valve, which serves to open and close the escape-ports through the main slide-valve, was connected with the steam-chest by means of a crank-arm and a rod that was pivoted to the crank-arm and pivotally connected with a bracket fixed to the end wall of the steam-chest, and with such construction the supplemental valve was moved constantly in accordance with the movements of the main slide-valve.

A still further object of my present invention is to connect the supplemental valve with the steam-chest (or any other relatively-fixed part of the engine structure) in such manner that there shall be a "lost motion" given to said supplemental valve, so that at certain periods during the movement of the main valve the supplemental valve shall remain stationary with respect to the main valve.

My invention has also for its object to improve, in various details hereinafter noted, the construction of valve mechanism illustrated in my above-mentioned patent.

To this end my invention consists in the several novel features of invention hereinafter described, illustrated in the accompanying drawings, and particularly defined in the claims at the end of this specification.

Figure 2:
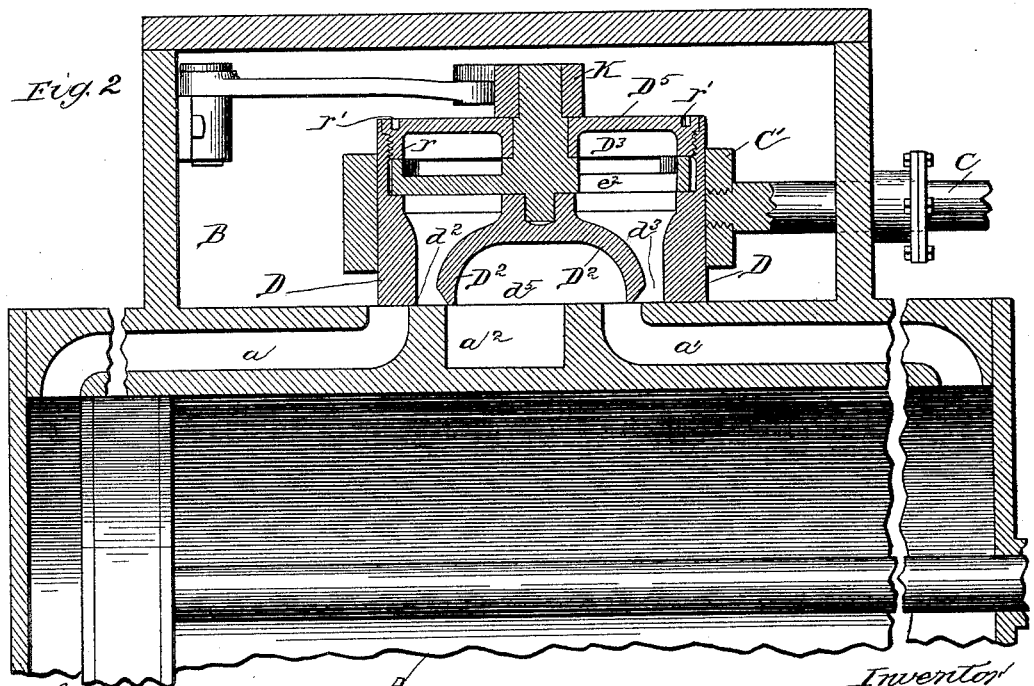
Figure 3:
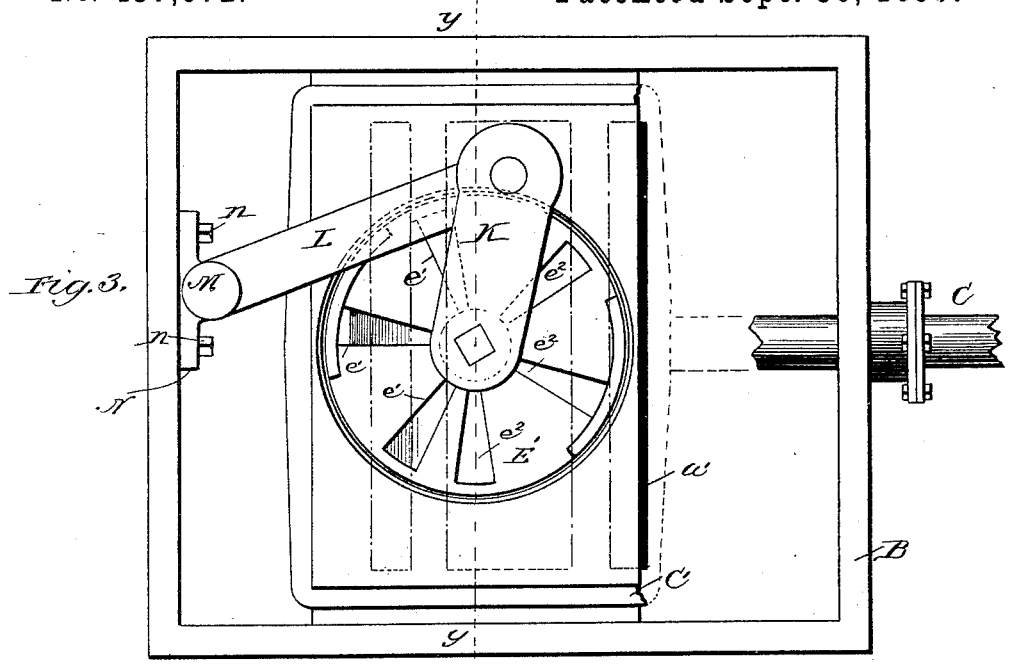
Figure 4:
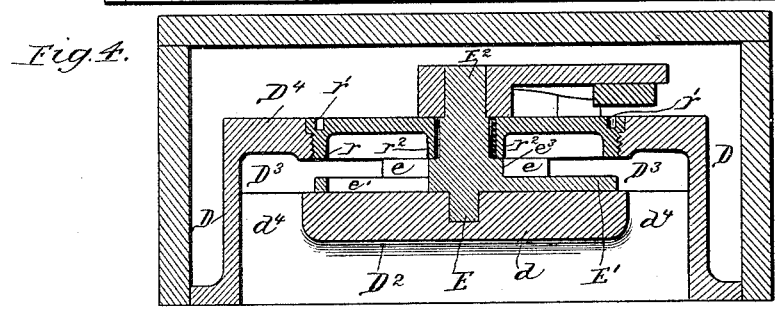
Figure 5:
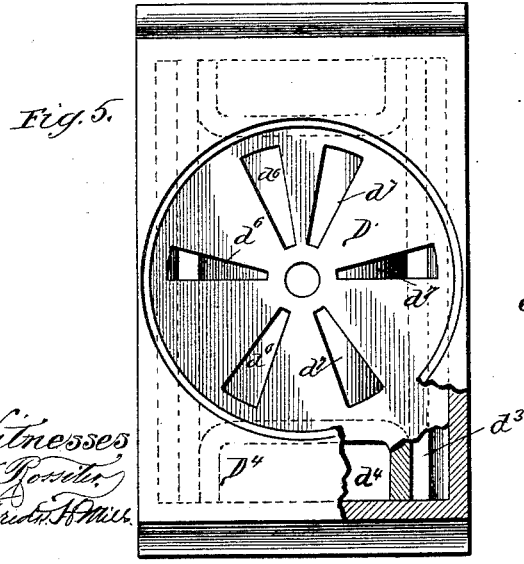
Figure 6:
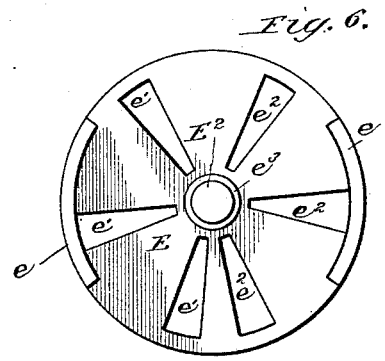

Figure 1 is a plan view of a steam-chest having my improved valve mechanism applied thereto, the cover of the main valve being removed, and parts being broken away for the purpose of better illustrating the subjacent parts. Fig. 2 is a view in vertical transverse section on line $x\,x$ of Fig. 1, the relation of the steam-chest to the main cylinder being also shown. Fig. 3 is a view similar to Fig. 1, but showing the parts in different position. Fig. 4 is a view in longitudinal section on line $y\,y$ of Fig. 3. Fig. 5 is a detail plan view of the main valve with its cover removed. Fig. 6 is a detail plan view of the supplemental valve. Fig. 7 is a plan view similar to Fig. 1, but showing an improved form of lost-motion mechanism for connecting the crank-arm of the supplemental valve with the steam-chest. Fig. 8 is a plan view similar to Fig. 7, the parts being shown in different position and portions being broken away. Fig. 9 is a plan view similar to Fig. 7, with the parts shown in different position and parts being broken away. Fig. 10 is a view in longitudinal vertical section through the lost-motion connection between the crank-arm of the supplemental valve and the steam-chest. Fig. 11 is a view in vertical transverse section on line $x\ x$ of Fig. 10.

A designates the main cylinder of the engine, provided with the usual steamways $a$ and $a'$ and exhaust-port $a^2$, and B denotes the steam-chest, within which, upon its appropriate seat, is placed the main slide-valve, that is operated by a valve-rod C in the usual manner, a yoke C′ being employed in the construction shown for connecting the valve-rod C with the valve.

The body of the main slide-valve is preferably cast in such manner as to form the outer walls or sides D in single piece with the port-plate D′ and the central plate $D^2$, these plates being connected together at the corners and by the central web $d$, and in such manner also as to form the top $D^4$ as a continuation of the side walls D. Between the sides of the central plate $D^2$ and the walls D of the valve are formed the long escape-ports $d^2$ and $d^3$, which communicate with the chamber $D^3$, that is formed by the walls D of the main valve and the top $D^4$ and cover $D^5$ thereof, and in my present construction these escape-ports $d^2$ and $d^3$ are formed of such length as to extend at each side of the transverse escape-ports $d^4$, which are in constant communication with the exhaust-ports $a^2$ of the main cylinder and the exhaust-cavity $d^5$ of the valve. The bottoms of the long escape-ports $d^2$ and $d^3$ are expanded, as shown in Fig. 2, by cutting away the inside edges of the plates which separate these ports from the exhaust-cavity $d^5$ of the main valve, the purpose of this construction being to extend the period during which the exhaust-steam may pass through these escape-ports. The cover $D^5$ is provided with a downwardly-extending flange $r$ adjacent its periphery, and upon the exterior of this flange, and, if desired, also upon the periphery of the cover, screw-threads will be cut adapted to engage with corresponding threads formed upon the edges of the circular opening in the top $D^4$ of the main valve, so that the cover $D^5$ of the main valve can be securely held in proper position to close the top thereof by merely screwing the cover $D^5$ into place, and to enable the cover to be thus screwed into place it will be provided with the spanner-hole $r'$ to admit a suitable wrench.

Within the central web $d$ of the main valve is formed a seat or socket adapted to receive one end of the arbor E of the supplemental valve E′, this arbor being preferably cast in one piece with such valve, and the upper face of the port-plate D′ will be suitably ground to form a seat whereon the supplemental valve may turn. It will be observed that upon the upper side of the supplemental valve E′ there is formed segmental flanges or lugs $e$, against which will bear the depending flange $r$ upon the under side of the cover $D^5$, the purpose of these flanges being to avoid the necessity of any retaining-ring, such as shown in my hereinbefore-mentioned Letters Patent, for holding the supplemental valve upon its seat.

It will be understood, however, as an obvious modification that, instead of providing both the supplemental valve E′ and the cover $D^5$ with flanges, a single flange of proper extent may be formed either upon the cover or upon the supplemental valve. From the upper face of the supplemental valve E′ extends the arbor $E^2$, that passes through the cover $D^5$ of the slide-valve, and at the base of this arbor there is preferably formed an annular shoulder $e^3$, against which will bear the depending flange $r^2$, formed upon the under side of the cover $D^5$ adjacent the central opening thereof, and by this construction it will be seen that a firm bearing for the supplemental valve is had both adjacent its center and its periphery.

Within the supplemental valve E′ are formed the radial apertures $e'$ and $e^2$, preferably six in number and corresponding in shape and location with the escape-ports $d^6$ and $d^7$, formed in the port-plate D′, and it is obvious that by avoiding the use of a retaining-ring for the supplemental valve, as in my patented construction, I am enabled to extend the apertures of the supplemental valve to a point much nearer its periphery, and consequently to give to such apertures a much greater area. So, also, by providing the supplemental valve with six apertures and the main valve with a corresponding number of escape-ports I am enabled to provide for a more free escape of the exhaust-steam than can be attained where but four apertures are used.

To the outer end of the arbor $E^2$ is keyed the crank-arm K, which serves to determine the movement of the supplemental valve as the main slide-valve is reciprocated, and at the outer end of this crank-arm is pivotally connected one end of the rod L, the opposite end of this rod being held upon the journal-pin M of the bracket-plate N, that is bolted, as shown at $n$, to the end wall of the steam-chest.

From the foregoing construction the operation of my improved mechanism as thus far defined will be seen to be as follows, this operation being substantially identical with that of the construction illustrated in my above-referred-to Letters Patent: Assuming the parts to be in the relative position shown in Figs. 1 and 2 of the drawings, at this instant live steam is being admitted from the steam-chest B through the steamway $a$ into the main cylinder behind the piston, and is being exhausted through the steamway $a'$ and through the exhaust-cavity $d^5$ and exhaust-port $a^2$ in the usual manner of ordinary slide-valve mechanism, and as well, also, through the escape-ports $d^3$, the escape-ports $d^7$ of the port-plate D', the apertures $e^2$ of the supplemental valve, the chamber $D^3$ of the main valve, the end port $d^4$, and the exhaust-port $a^2$ of the main valve. The exhaust thus continues until the main slide-valve has completed its movement and has been so reversed as to cut off the steam and cause it to work expansively. When the steam has been thus cut off by closing the steamway $a$ or shortly thereafter, the direct communication is also broken between the steamway $a'$ and the exhaust-cavity $d^5$; but there is still a free discharge for the exhaust-steam through the long port $d^3$, the ports $d^7$ of the port-plate D'; the ports $e^2$ of the supplemental valve, the chamber $D^3$, the end ports $d^4$, and the main exhaust-port $a^2$, so that as the steam is acting expansively to move the piston the exhaust-steam can escape freely from the main cylinder by reason of this coincidence of the steamway $a'$ with the long escape-port $d^3$ and of the escape-ports $d^7$ with the corresponding escape-ports $e^2$ of the supplemental valve. As the main slide-valve continues to move backward after having cut off the steam, the rod L and crank K, in the construction illustrated in Figs. 1 to 6 of the drawings, by reason of their connection with the arbor of the supplemental valve, cause this valve to partially rotate until the apertures $e^2$ of the supplemental valve no longer coincide with the ports $d^7$ of the main valve, and hence these ports are closed. The complete closing of the ports $d^7$ by the partial rotation of the supplemental valve occurs when the main valve is about mid-stroke and before the main piston has completed its stroke. As the main slide-valve now continues to move backward from its mid-stroke position the rod L and crank K cause the further rotation of the supplemental valve until the apertures $e'$ of this valve are brought partially coincident with the ports $d^6$ of the main valve, this coincidence occurring by the time the main slide-valve has moved backward far enough to permit live steam to enter from the steam-chest through the steamway $a'$ behind the piston. As live steam is thus admitted through the steamway $a'$ the exhaust-steam will escape through the steamway $a$ directly into the exhaust-cavity $d^5$ and main exhaust-port $a^2$ and indirectly through the long escape-port $d^2$ of the main valve, the ports $d^6$ and apertures $e'$ of the supplemental valve, the chamber $D^3$, the end ports $d^4$, and the main exhaust-port $a^2$ of the cylinder. This direct and indirect escape of the exhaust-steam thus continues until shortly after the main valve is reversed and the live steam cut off from the steamway $a'$, after which the entire escape of the exhaust-steam occurs through the long escape-port $d^2$ of the main valve, the ports $d^6$, the apertures $e'$ of the supplemental valve, the chamber $D^3$, the ports $d^7$, and the main exhaust-port $a^2$.

The above-described operation is substantially the same as that set forth in my patent, No. 347,012, with the exception that instead of the four short ports shown in the main valve-plate D' and a corresponding number of apertures in the supplemental valve, I have provided the main valve and supplemental valve with six longer ports, the purpose being to allow a more ready escape of the steam; but in this construction, as in that set forth in my prior patent, the movement of the supplemental valve with respect to the main slide-valve is controlled by a positive connection between the supplemental valve and the end wall of the steam-chest.

With the foregoing construction and operation in mind, the construction and operation of the lost-motion connection between the supplemental valve and the steam-chest, next to be described, will more fully appear, reference being had to Figs. 7, 8, 9, 10, and 11 of the drawings. In this construction the pin $k$ of the crank-arm K of the supplemental valve is journaled within the movable block K', that is provided with grooves in its sides to receive the ribs $s$ of the yoke S, upon which ribs the block K' is free to slide. The yoke S is bolted, as shown at $s'$, to the outer end of the rod L, which is pivotally connected by the pin M to a bracket N, that is bolted, as at $n$, to the end wall of the steam-chest. The movable block K' is by preference provided with the short stud $k^2$, adapted to enter the seat $l$, formed in the end of the rod L, and bear against a weak compression-spring T, that is held within said seat and encircles the pin $k^3$, that projects from the end of the stud $k^2$. From the opposite end of the movable block K' extends a similar stud $k^4$, that enters a corresponding seat $s^4$, formed in the end of the yoke, and bears against a compression-spring T', held within said seat and encircling the pin $k^5$, that projects from the stud $k^4$. The construction of the main and supplemental valves shown in Figs. 7, 8, and 9 of the drawings is the same as that illustrated in Figs. 1 to 6.

The relative operation of the main and supplemental valves when provided with the lost-motion connection illustrated in Figs. 7 to 11 of the drawings is as follows: Assuming the main slide-valve to have been moved backward until the steamway $a$ has been to a great extent uncovered, as shown in Fig. 7, it will be found that during such backward movement of the main slide-valve the movable block K' has assumed the position shown in Fig. 7 and crank-arm K has been moved sufficiently to cause the supplemental valve E' to rotate until its apertures $e^2$ have some coincident with the corresponding apertures $d^7$ in the subjacent port-plate D' of the main valve, and when in such position the escape of the exhaust-steam will be directly through the steamway $a'$ into the exhaust-cavity $d^5$ (see Fig. 2) and main exhaust-port $a^2$, it being observed that in Fig. 7 the main slide-valve has been moved somewhat farther backward than as shown in Figs. 1 and 2, so as to open more widely the steamway $a$. If now the main slide-valve be moved in reverse direction, from the position shown in Fig. 7 to that shown in Fig. 8 of the drawings, the steamway $a$ will be closed—that is to say, the steam will be cut off—and the steam within the cylinder will be operating expansively; but it will be observed by reference to Fig. 8 that during this initial reverse movement of the main slide-valve the lost-motion connection between the supplemental valve and the steam-chest has prevented any change of position of the supplemental valve with respect to the main slide-valve, and as a consequence the apertures $e^2$ of the supplemental valve remain wide open, so that a full and free exhaust of the steam will occur through the steamway $a'$, the long escape-port $d^3$, the ports $d^7$, the apertures $e^2$ of the supplemental valve, the chamber $D^3$, the end ports $d^4$, and the main exhaust-port $a^2$ of the cylinder. The reason of this operation is apparent from the fact that during the movement of the main slide-valve from the position shown in Fig. 7 to the position shown in Fig. 8 the crank-arm K forces backward the movable block K' against the action of the compression-spring T, which spring, being very weak and designed merely as a cushion, will not cause any movement of the crank-arm or of the supplemental valve. The supplemental valve thus continues to maintain its fixed position with respect to the main slide-valve, although moving therewith, until shortly after the steam has been thus cut off; but when the movable block K' reaches the limit of its movement and contacts with the end of the rod L such contact will check the further movement of the crank-arm K with the main slide-valve, and consequently will cause a partial rotation of the supplemental valve with respect to the main slide-valve. The effect of this checking of the movement of the movable block K' and the crank-arm K is to quickly shift the position of the supplemental valve with respect to the main valve, so that, although the apertures of the supplemental valve remain wide open for a longer period than when a positive connection is employed between the supplemental valve and the steam-chest, as illustrated in Figs. 1 to 6 of the drawings, still the complete closing of the apertures of the supplemental valve will occur when the main slide-valve is about its mid-stroke position. Shortly after the main slide-valve has passed its mid-stroke position, and in passing to the point indicated in Fig. 9 of the drawings, the apertures $e'$ of the supplemental valve will be brought to coincide (by reason of the rotation of the supplemental valve) with the ports $d^6$ of the port-plate D' of the main slide-valve, and when the main slide-valve is in such position it is obvious that the steam will enter the main cylinder through the steamway $a'$ and will exhaust through the steamway $a$. If the steamway $a'$ be wide open, or approximately so, the exhaust will occur at first directly and entirely through the steamway $a$, through the cavity $d^5$, and main exhaust-port $a^2$; but as soon as the main slide-valve begins its backward travel to cut off the entrance of the steam through the steamway $a'$ the exhaust will occur through the long escape-port $d^2$, the ports $d^6$, the apertures $e^2$ of the supplemental valve, the chamber $D^3$, the end ports $d^4$, and the main exhaust-port $a^2$ of the cylinder.

From the foregoing description it will be seen that by providing a lost-motion connection between the supplemental valve and the steam-chest I am enabled not only to hold the escape ports or apertures of the supplemental valve wide open for the escape of steam much longer than is possible where a positive connection between the supplemental valve and the steam-chest is employed, as illustrated in my former patent, and as illustrated also in Figs. 1 to 6 of the drawings, but, moreover, by this lost-motion connection I am enabled to delay the release of the steam much longer, and as a consequence to attain much more fully the advantage of the expansive action of the steam within the cylinder. In other words, it will appear by following the movements of the main and supplemental valves when a positive connection is employed for the supplemental valve, as in Figs. 1 to 6 of the drawings, that the release of the steam occurs through the apertures of the supplemental valve a short time before the release occurs directly from the steamway over the bridge-wall and into the main exhaust-port $a^2$ of the cylinder; but in following the relative movements of the main and supplemental valves when provided with a lost-motion connection, as illustrated in Figs. 7 to 11 of the drawings, it is apparent that the release will occur through the apertures of the supplemental valve until it also begins to occur directly from the steamway over the bridge-wall and into the main exhaust-cavity $a^2$ of the cylinder. In other words, the lost-motion connection enables the release of the steam to be delayed a length of time corresponding with the distance which the movable block K' is allowed to travel, and in practice this distance should correspond precisely with the amount of "inside lap" which is given to the main valve. By causing the escape-apertures of the supplemental valve to be closed just before the main slide-valve reaches its midstroke position I secure a sufficient air-cushion or a sufficient air-and-steam cushion within the cylinder to prevent the pounding of the piston against the cylinder-heads.

While I have illustrated in the accompanying drawings but one form of lost-motion connection, it is obvious that any other suitable form of lost-motion connection may be substituted for that shown, and the lost motion may occur at any suitable point between the supplemental valve and the steam-chest or other relatively-fixed part of the engine structure. So, also, while I have illustrated a lost-motion connection in conjunction with a disk-shaped valve, it is obvious that without departing from the spirit of my invention this kind of connection may be used in conjunction with other types of supplemental valves which serve to control the flow of steam through the escape-ports of the main valve.

I do not wish my invention to be understood as restricted to the details of construction above set out, which can be varied within wide limits by the skilled mechanic.

Having thus described my invention, what I claim as new, and desire to secure by Letters Patent, is—

1. In valve mechanism for steam-engines, the combination, with the main chambered valve having escape-ports therein, and a supplemental valve for controlling said escape-ports, of a valve-cover and a flange or flanges between said supplemental valve and the valve-cover and connected thereto, substantially as described.

2. In valve mechanism for steam-engines, the combination, with the main chambered valve having escape-ports therein, and a supplemental valve for controlling said escape-ports, of a valve-cover and a flange or flanges between said cover and the supplemental valve and connected thereto, said flange or flanges being cut away to permit the passage of steam, substantially as described.

3. In valve mechanism for steam-engines, the combination, with the main chambered valve having a screw-threaded opening in its top, having escape-ports, and having a supplemental valve for controlling said escape-ports, of a cover screw-threaded to engage the threaded opening in the top of the valve, substantially as described.

4. In valve mechanism for steam-engines, the combination, with a main valve having escape-ports therein and having a supplemental valve for controlling said escape-ports, of a lost-motion connection for controlling said supplemental valve, substantially as described.

5. In valve mechanism for steam-engines, the combination, with a main chambered valve having escape-ports therein and having a supplemental valve for controlling said escape-ports, of an arbor extending through the top of said main valve, and a lost-motion connection for controlling said supplemental valve, substantially as described.

6. In valve mechanism for steam-engines, the combination, with a main chambered valve having escape-ports therein and having a supplemental disk-valve for controlling said escape-ports, of a lost-motion connection extending between said supplemental disk-valve and the steam-chest, substantially as described.

7. In valve mechanism for steam-engines, the combination, with a main chambered valve having escape-ports therein and a supplemental valve provided with apertures adapted to control said escape-ports, of an arbor for said supplemental valve extending through the cover of the main valve, a crank attached to said arbor, and a lost-motion connection between said crank and the steam-chest, substantially as described.

8. In valve mechanism for steam-engines, the combination, with the main chambered valve having escape-ports therein and having a supplemental disk-valve for controlling said escape-ports, said supplemental disk-valve being provided with an arbor and with a crank, of a lost-motion connection comprising a movable block affixed to the outer end of said arbor, and a rod connected with said block and with the steam-chest, substantially as described.

9. In valve mechanism for steam-engines, the combination, with the main valve having escape-ports therein, the supplemental valve E', provided with apertures, the arbor $E^2$ for said supplemental valve, and the crank K, attached to said arbor, of a lost-motion connection, a movable block K', a yoke S, within which said block is free to move, and a rod L, connected with the steam-chest, substantially as described.

CHARLES SCHMID.

Witnesses:
   GEO. P. FISHER, Jr.,
   I. B. CARPENTER.